US010545570B2

(12) United States Patent
Woo et al.

(10) Patent No.: US 10,545,570 B2
(45) Date of Patent: Jan. 28, 2020

(54) METHOD FOR PROVIDING CONTENT AND APPARATUS THEREFOR

(71) Applicant: Samsung Electronics Co., Ltd., Gyeonggi-do (KR)

(72) Inventors: Ji-Hwan Woo, Seoul (KR); Byeong-Doo Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/966,941

(22) Filed: Apr. 30, 2018

(65) Prior Publication Data

US 2018/0329482 A1 Nov. 15, 2018

Related U.S. Application Data

(60) Provisional application No. 62/529,851, filed on Jul. 7, 2017.

(30) Foreign Application Priority Data

Apr. 28, 2017 (KR) .................. 10-2017-0055773
Nov. 23, 2017 (KR) .................. 10-2017-0157376

(51) Int. Cl.
*G06F 3/01* (2006.01)
*G06T 15/00* (2011.01)

(52) U.S. Cl.
CPC ............ *G06F 3/011* (2013.01); *G06T 15/005* (2013.01)

(58) Field of Classification Search
CPC .......... G02B 2027/0138; G02B 27/017; G02B 2027/014; G02B 27/0172; G02B 2027/0134; G02B 2027/0178; G02B 2027/0187; G02B 27/0093; G06F 3/013; G06F 3/0346; G06F 17/00; G06F 2203/013; G06F 3/011; G06F 3/012; G06F 3/017;
(Continued)

(56) References Cited

U.S. PATENT DOCUMENTS 5,430,806 A * 7/1995 Nettles .................... G06T 15/20
382/295
6,317,127 B1 11/2001 Daily
(Continued)

FOREIGN PATENT DOCUMENTS

WO WO 2015/155406 10/2015
WO WO 2016/087702 6/2016

OTHER PUBLICATIONS

International Search Report dated Aug. 21, 2018 issued in counterpart application No. PCT/KR2018/004966, 8 pages.

*Primary Examiner* — Devona E Faulk
*Assistant Examiner* — Ming Wu
(74) *Attorney, Agent, or Firm* — The Farrell Law Firm, P.C.

(57) ABSTRACT

A method for processing virtual reality (VR) content by a content providing device includes identifying cartesian coordinates of a first position on the VR content, estimating a movement of a user of the content providing device, identifying cartesian coordinates of a second position by applying a matrix representing the estimated movement of the user to the cartesian coordinates of the first position, converting the cartesian coordinates of the second position into spherical coordinates of the second position, and providing an area corresponding to the spherical coordinates of the second position to the user.

12 Claims, 17 Drawing Sheets

(58) Field of Classification Search
CPC ... G06F 3/0304; G06F 3/04815; G06T 15/20; G06T 19/006; G06T 15/10; G06T 1/20; G06T 2207/30204; G06T 2219/024; G06T 7/70; G06T 7/73
See application file for complete search history.

(56) References Cited

U.S. PATENT DOCUMENTS

| | | | |
|---|---|---|---|
| 2012/0139830 A1* | 6/2012 | Hwang | G06F 3/012 345/156 |
| 2016/0232715 A1* | 8/2016 | Lee | G06T 19/006 |
| 2017/0084084 A1 | 3/2017 | Durham et al. | |
| 2017/0302719 A1* | 10/2017 | Chen | H04L 65/4069 |

* cited by examiner

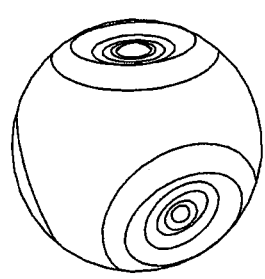 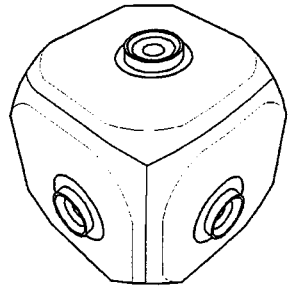 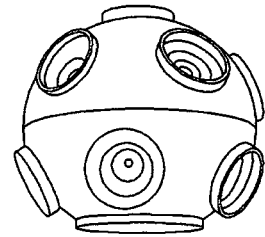
| Tetrahedron (4 faces) 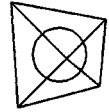 | Cube (6 faces) 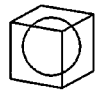 | Dedecahedron (12 faces)  |
FIG.11A  FIG.11B  FIG.11C

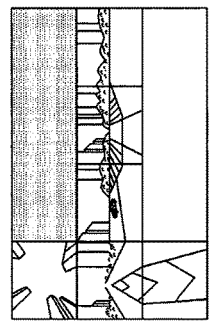
FIG.12B
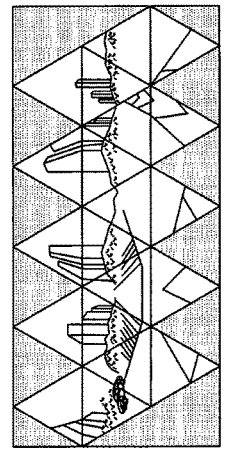
FIG.12C
| Projections | 3D Model | 2D Projection |
|---|---|---|
| Tetrahedron (4 faces) | | 1201 |
| Cube (6 faces) | | 1202 |
| Octahedron (8 faces) | | 1203 |
| Dedecahedron (12 faces) | | 1204 |
| Icosahedron (20 faces) | | 1205 |
FIG.12A Table 9

7.2.1.3 Conversion from a sample location in a projected picture to angular coordinates relative to the global coordinate axes Inputs to this clause are

- center point of a sample location (xProjPicture, yProjPicture) within a projected picture,
- picture width pictureWidth, and
- picture height pictureHeight.

NOTE: For stereoscopic video, this projected picture is top-bottom or side-by-side frame-packed.

Outputs of this clause are:

- angular coordinates (yawGlobal, pitchGlobal), in units of degrees relative to the global coordinate axes, and
- when StereoVideoBox is present, the index of the constituent picture (constituentPicture) equal to 0 or 1.

The outputs are derived with the following ordered steps:

- If xProjPicture is greater than or equal to pictureWidth or yProjPicture is greater than pictureHeight, the following applies:
    - constituentPicture is set equal to 1
    - If xProjPicture is greater than or equal to pictureWidth, xProjPicture is set to xProjPicture − pictureWidth.
    - If yProjPicture is greater than or equal to pictureHeight, yProjPicture is set to yProjPicture − pictureHeight.
- Otherwise, constituentPicture is set equal to 0.
- Clause 5.2.1 is invoked with pictureWidth, pictureHeight, xProjPicture, and yProjPicture as inputs, and the output is assigned to yawLocal, pitchLocal.
- If ProjectionOrientationBox is present, clause 5.3 is invoked with yawLocal, pitchLocal, orientation_yaw ÷ $2^{16}$, orientation_pitch ÷ $2^{16}$ and orientation_roll ÷ $2^{16}$ as inputs, and the output is assigned to yawGlobal and pitchGlobal.
- Otherwise, yawGlobal is set equal to yawLocal and pitchGlobal is set equal to pitchLocal.

FIG. 15

Table 10

7.2.2 Projected omnidirectional video box

7.2.2.1 Definition

Box Type: `'povd'`
Container: Scheme Information box (`'schi'`)
Mandatory: Yes, when scheme_type is equal to `'podv'`
Quantity: Zero or one The properties of the projected pictures are indicated with the following:

- the projection format of the projected picture (C for monoscopic video contained in the track, $C_L$ and $C_R$ for left and right view of stereoscopic video);

- the orientation of the projection structure relative to the global coordinate axes; and

- the spherical coverage of the projected omnidirectional video (i.e., the area on the spherical surface that is represented by the projected picture).

7.2.2.2 Syntax

```
aligned(8) class ProjectedOmnidirectionalVideoBox extends Box('povd') {
    ProjectionFormatBox();  // mandatory
    ProjectionOrientationBox();  // optional
    CoverageInformationBox();  // optional
} aligned(8) class ProjectionFormatBox() extends FullBox('prfr', 0, 0) {
    ProjectionFormatStruct();
} aligned(8) class ProjectionFormatStruct() {
    bit(3) reserved = 0;
    unsigned int(5) projection_type;
}
```

7.2.2.3 Semantics projection_type indicates the particular mapping of the rectangular decoder picture output samples onto the spherical coordinate system specified in clause 5.1, where ϕ is the azimuth (longitude) or the *YawAngle* and θ is the elevation (latitude) or the *PitchAngle*. projection_type equal to 0 indicates the equirectangular projection as specified in clause 1. Other values of projection_type are reserved.

FIG. 16

Table 11

7.2.5 Projection orientation box 7.2.5.1 Definition

Box Type: 'pror'
Container: Projected omnidirectional video box ('povd')
Mandatory: No
Quantity: Zero or one When the projection format is the equirectangular projection, the fields in this box provides the yaw, pitch, and roll angles, respectively, of the center point of the projected picture when projected to the spherical surface. In the case of stereoscopic omnidirectional video, the fields apply to each view individually. When the ProjectionOrientationBox is not present, the fields orientation_yaw, orientation_pitch, and orientation_roll are all considered to be equal to 0.

7.2.5.2 Syntax

```
aligned(8) class ProjectionOrientationBox extends FullBox('pror', version = 0, flags) {
    signed int(32) orientation_yaw;
    signed int(32) orientation_pitch;
    signed int(32) orientation_roll;
}
```

7.2.5.3 Semantics orientation_yaw, orientation_pitch, and orientation_roll specify the yaw, pitch, and roll angles, respectively, of the center point of the projected picture when projected to the spherical surface, in units of $2^{-16}$ degrees relative to the global coordinate axes. orientation_yaw shall be in the range of $-180 * 2^{16}$ to $180 * 2^{16} - 1$, inclusive. orientation_pitch shall be in the range of $-90 * 2^{16}$ to $90 * 2^{16}$, inclusive. orientation_roll shall be in the range of $-180 * 2^{16}$ to $180 * 2^{16} - 1$, inclusive.

FIG. 17

Table 12

7.2.6 Coverage information box

7.2.6.1 Definition

Box Type: `'covi'`
Container: Projected omnidirectional video box (`'povd'`)
Mandatory: No
Quantity: Zero or one This box provides information on the area on the spherical surface that is associated with this track and is represented by the projected picture associated with the container `ProjectedOmnidirectionalVideoBox`. The absence of this box indicates that the projected picture is a representation of the full sphere.

> NOTE: When `CoverageInformationBox` is included in a tile base track, as specified in ISO IEC 14496-15, it provides information on the area on the spherical surface that is represented by the tile tracks, as specified in ISO IEC 14496-15, associated with the tile base track.

The fields in this box apply after the application of the `ProjectionOrientationBox`, when present When the projection format is the equirectangular projection, the spherical region represented by the projected picture is the region specified by two yaw circles and two pitch circles, as illustrated by Figure 5-4.

7.2.6.2 Syntax

```
aligned(8) class CoverageInformationBox extends FullBox('covi', version = 0, flags) {
    RegionOnSphereStruct(1); // defined in 7.4.3.2
}
```

7.2.6.3 Semantics

When `RegionOnSphereStruct(1)` is included in the `CoverageInformationBox`, the following applies:

`center_yaw`, `center_pitch`, and `center_roll` specify the center point of the spherical region represented by the projected picture, in units of $2^{-16}$ degrees, relative to the coordinate system specified through the `ProjectionOrientationBox`. `center_yaw` shall be in the range of $-180 * 2^{16}$ to $180 * 2^{16} - 1$, inclusive. `center_pitch` shall be in the range of $-90 * 2^{16}$ to $90 * 2^{16}$, inclusive. `center_roll` shall be in the range of $-180 * 2^{16}$ to $180 * 2^{16} - 1$, inclusive.

`hor_range` and `ver_range` specify the horizontal and vertical range, respectively, of the region represented by the projected picture, in units of $2^{-16}$ degrees. `hor_range` and `ver_range` specify the range through the center point of the region. `hor_range` shall be in the range of 1 to $720 * 2^{16}$, inclusive. `ver_range` shall be in the range of 1 to $180 * 2^{16}$, inclusive.

`interpolate` shall be equal to 0.

METHOD FOR PROVIDING CONTENT AND APPARATUS THEREFOR

PRIORITY

This application claims priority under 35 U.S.C. § 119(a) to Korean Patent Application No. 10-2017-0055773 filed in the Korean Intellectual Property Office on Apr. 28, 2017, Korean Patent Application No. 10-2017-0157376 filed in the Korean Intellectual Property Office on Nov. 23, 2017 and U.S. Provisional Patent Application No. 62/529,851 filed in the United States Patent and Trademark Office on Jul. 7, 2017, the entire disclosures of which are incorporated herein by reference.

BACKGROUND

1. Field of the Disclosure

The present disclosure relates generally to methods for providing content and apparatuses therefor, and specifically, to methods and apparatuses capable of providing virtual reality (VR) content.

2. Description of the Related Art

VR refers to a particular environment or context that is artificially created using a computer that is similar to a natural environment, or a technology therefor. An environment or context provided to the user through VR content may stimulate the user's five senses to allow the user to feel a spatial or temporal experience similar to reality. The user may be engrossed in VR content and also be able to manipulate or command a real device to interact with objects implemented in the VR content. VR content may be distinct from simulations that are uni-laterally implemented in that it may interact with users and create experiences with users.

VR content may be provided to the user via a VR device such as a head mounted display (HMD) that is put on the user's head, with a display that is positioned before the user's eyes and displays VR content.

The user may move his/her head in various directions while using the VR device, thus changing the direction in which she is viewing. To provide lifelike VR content, VR devices should be able to provide VR content that reflects changes in the direction of the user's view.

SUMMARY

The present disclosure provides a method for providing VR content that may reflect the user changing a direction in which she is viewing (e.g., turning or moving her head), and an apparatus therefor.

According to an embodiment of the present disclosure, a method for processing VR content by a content providing device includes identifying cartesian coordinates of a first position on the VR content, estimating a movement of a user of the content providing device, identifying cartesian coordinates of a second position by applying a matrix representing the estimated movement of the user to the cartesian coordinates of the first position, converting the cartesian coordinates of the second position into spherical coordinates of the second position, and providing an area corresponding to the spherical coordinates of the second position to the user.

According to another embodiment of the present disclosure, a content providing device for processing VR content includes a location sensor configured to estimate a movement of a user of the content providing device; and a processor configured to control the content providing device to identify cartesian coordinates of a first position on the VR content, identify cartesian coordinates of a second position by applying a matrix representing the estimated movement of the user to the cartesian coordinates of the first position, convert the cartesian coordinates of the second position into spherical coordinates of the second position, and provide an area corresponding to the spherical coordinates of the second position to the user.

BRIEF DESCRIPTION OF THE DRAWINGS

The above and other aspects, features, and advantages of the present disclosure will be more apparent from the following detailed description when taken in conjunction with the accompanying drawings, in which:

FIGS. 11A-11C illustrate a device for capturing images to produce visual content contained in VR content, according to an embodiment of the present disclosure;

FIGS. 12A-12C illustrate examples of 2D projection methods and 2D projection images, according to an embodiment of the present disclosure;

FIG. 15 illustrates a table providing an example of information for unpacking, according to an embodiment of the present disclosure;

FIG. 16 illustrates a table providing of information about a 2D projection image, according to an embodiment of the present disclosure;

FIG. 17 illustrates a table providing of information about a 2D projection image, according to an embodiment of the present disclosure; and FIG. 18 illustrates a table providing of information about a 2D projection image, according to an embodiment of the present disclosure.

DETAILED DESCRIPTION

Figure 1:
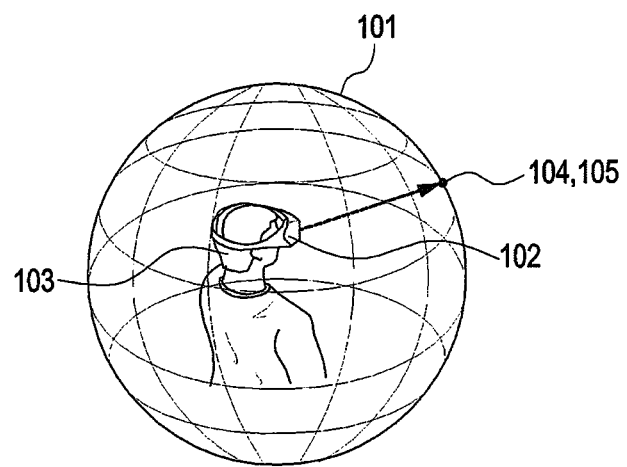
FIG. 1 illustrates a projection structure applied to a VR device, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Although the terms "first" and "second" are used to describe various components, the components are not limited by the terms. These terms are provided simply to distinguish one component from another. Accordingly, a first component described herein may be referred to as a second component and vice versa within the technical spirit of the present disclosure.

VR content, projection structure, a user's viewing perspective, and coordinate systems of a VR device, according to an embodiment of the present disclosure, are described with reference to FIGS. 1 to 3.

FIG. 1 illustrates a projection structure applied to a VR device, according to an embodiment of the present disclosure. FIG. 2 illustrates a user's viewing perspective in a VR device, according to an embodiment of the present disclosure. FIG. 3 illustrates, on coordinate axes, a method for representing the rotation of a user's view direction in a VR device, according to an embodiment of the present disclosure.

VR content is assumed to be omnidirectional content that is mapped to 360-degree directions around the user who uses a VR device. However, VR content need not necessarily include all content corresponding to the whole 360-degree area, but may rather include only content corresponding to a part of the area. VR content may include content elements, such as audio content, video content, image content, subtitles, smells, or winds, which may be classified into virtual content, auditory content, olfactory content, or tactile content. When produced, at least some of the elements of the VR content may be sorted in corresponding directions of 360-degree directions.

A projection structure is described with reference to FIG. 1.

Visual content may be produced in 360-degree directions, implementing a virtual spherical space 101. It may be assumed that a user 103 wearing a VR device 102 is positioned at the center of the virtual spherical space 101 to observe the inner surface of the virtual spherical space 101. In other words, VR content produced may be projected to the virtual spherical space 101, which is referred to as a projection structure. Herein, the projection structure is assumed to be a unit sphere with a radius (r) of 1.

VR content is provided to the user through the VR device. In this disclosure, the VR device is assumed to be an HMD that is put on the user's head, with a display that is positioned before the user's eyes and displays VR content.

Viewing perspectives of the VR device and the user are described below with reference to FIGS. 1 and 2.

The user 103 wearing the VR device 102 may move her head in various directions while in use of the VR device 102 and the direction in which the user 103 is viewing may change accordingly. At this time, the direction in which the user 103 is viewing is defined as the viewing perspective 104. The viewing perspective 104 of the VR device may mean the viewpoint that is the center point of the viewport which is an area of the VR content being currently provided to the user 103.

Specifically, the viewing perspective 104 of the VR device 102 is assumed to be a direction in which a straight line passing through the center of the surface of the display screen included in the VR device and perpendicular to the surface of the display area is oriented towards the outside of the user 103 wearing the VR device 102.

For example, assuming that the user 103 wearing the VR device 102 is positioned at the center of the virtual spherical space 101, the direction in which the user 103 is viewing from the center of the virtual sphere 101 through the inner surface of the sphere to the outside may be assumed to be the viewing perspective 104 of the VR device 102. Further, under the assumption that the virtual spherical space 101 has a predetermined r, the point where the straight line perpendicular to the display area and passing through the center of the surface of the display screen included in the VR device 102 as viewed from the center of the virtual sphere 101 to the outside meets the inner surface of the virtual sphere 101 may be defined as the viewing perspective 104 of the VR device 102. Here, the virtual spherical space 101 may correspond to a virtual space that the VR content implements.

The viewing perspective 104 of the VR device 102 may be the same as the viewing perspective 105 of the user 103 wearing the VR device 102. At this time, the user 103 is assumed to be gazing at the display screen of the VR device 102. The user's viewing perspective 105 may be defined as the direction in which a straight line passing through the center of a straight line connecting the user's eyes is directed to the outside of the user.

Although the viewing perspective 104 of the VR device 102 and the user's viewing perspective 105 are defined as above, the viewing perspective of the VR device and the user's viewing perspective may be defined in other various ways, according to embodiments of the present disclosure.

Further, where a sensor tracking the movement of the user's pupils is equipped in the VR device, the direction in which the user's pupils move may be defined as the user's viewing perspective in which case the user's viewing perspective may be different from the viewing perspective of the VR device.

Coordinate systems applied in this disclosure are described below with reference to FIG. 3.

The viewing perspective of the VR device, the user's viewing perspective, the user's motion, and VR content are assumed to move on the same coordinate axes. The viewing perspective of the VR device, the user's viewing perspective, the user's motion, and VR content may be represented as spherical coordinates or cartesian coordinates on the same coordinate axes.

Figure 3:
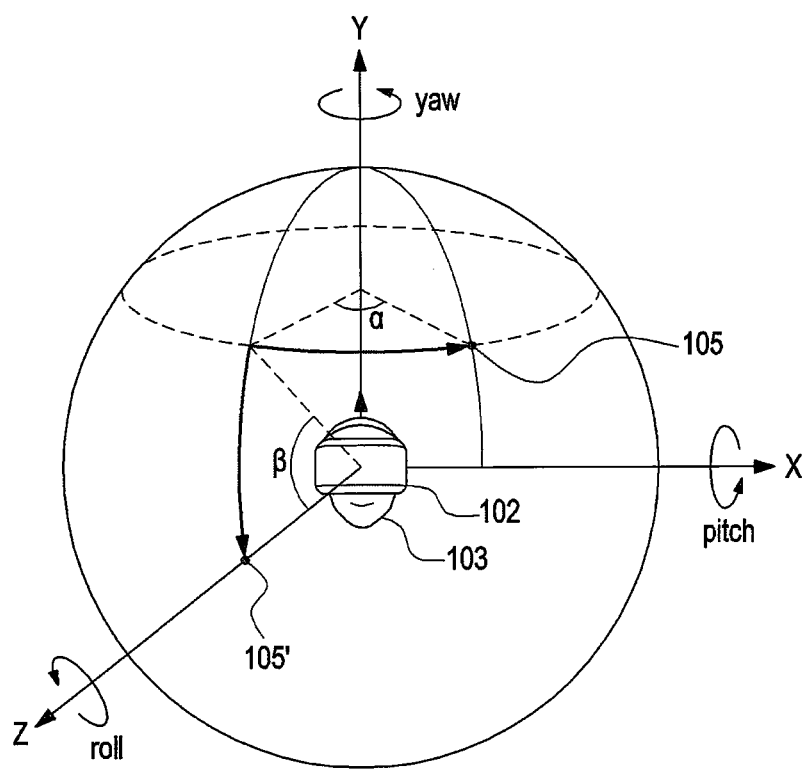
FIG. 3 illustrates, on coordinate axes, a method for representing the rotation of a user's viewing perspective in a VR device, according to an embodiment of the present disclosure.

As shown in FIG. 3, the center point of the VR device 102 or the center of the head of the user 103 are assumed to be positioned at the center of the coordinate axes. The center of the VR space that the VR content implements may be assumed to be positioned at the center of the coordinate axes, or the position where visual VR content is obtained may be assumed to be positioned at the center of the coordinate axes.

The movement of the user's viewing perspective may be represented with a yaw angle, a pitch angle, and a roll angle. The yaw angle $\alpha$ may mean an angle at which the user's viewing perspective rotates around the y axis. The yaw angle $\alpha$ may be defined in the range from −180 degrees to 180 degrees and as rotation counterclockwise as viewed from above the y axis to the center of the coordinate axes. The pitch angle β may mean an angle at which the user's viewing perspective rotates around the x axis. The pitch angle β may be defined in the range from −90 degrees to 90 degrees and as rotation counterclockwise as viewed from above the x axis to the center of the coordinate axes. The roll angle γ may mean an angle at which the user's viewing perspective rotates around the z axis. The roll angle γ may be defined in the range from −180 degrees to 180 degrees and as rotation counterclockwise as viewed from above the z axis to the center of the coordinate axes.

On the other hand, according to an embodiment of the present disclosure, the yaw angle α may mean an angle at which the user's viewing perspective rotates around the z axis, the pitch angle β may mean an angle at which the user's viewing perspective rotates around the y axis, and the roll angle γ may mean an angle at which the user's viewing perspective rotates around the x axis.

Alternatively, the yaw angle α may mean an angle at which the user's viewing perspective rotates around the x axis, the pitch angle β may mean an angle at which the user's viewing perspective rotates around the z axis, and the roll angle γ may mean an angle at which the user's viewing perspective rotates around the y axis.

In other words, the yaw angle, pitch angle, and roll angle may be defined based on different rotation axes as long as the same reference is used in the internal system of one VR device.

The VR device 102 includes a location sensor. When the location sensor detects a variation in the viewing perspective of the VR device 102, the location sensor obtains information about the movement of the viewing perspective of the VR device 102 and provides the information to the VR device 102. The location sensor may provide the yaw angle α, pitch angle β, and roll angle γ for the movement of the viewing perspective of the VR device 102. At this time, the order in which the yaw, pitch, and roll components are measured or obtained for the movement of the viewing perspective of the VR device 102 may be previously defined. In other words, the order in which the movement of the viewing perspective of the VR device 102 is measured or obtained may be previously set in the location sensor or VR device. For example, the location sensor may measure or obtain the yaw angle α, pitch angle β, and roll angle γ in the order thereof for the movement of the viewing perspective of the VR device 102.

The location sensor may include at least one or more various sensors, such as an accelerometer for measuring acceleration, a gyroscope for measuring angular speed, or a magnetometer which is a geo-magnetic sensor. As an example of measuring the movement of the viewing perspective of the VR device, the roll angle or pitch angle may be measured by an accelerometer or a gyroscope, and the yaw angle may be measured by a gyroscope or a magnetometer. However, this is merely an example of a method for obtaining information about the movement of the viewing perspective of the VR device. Embodiments of the present disclosure are not limited thereto and any other various types of location sensors or measuring methods may be adopted as long as they are able to measure the movement of the VR device.

A method for operating a VR device, according to an embodiment of the present disclosure, is described below with reference to FIG. 1 and FIGS. 3 to 6.

Figure 4:
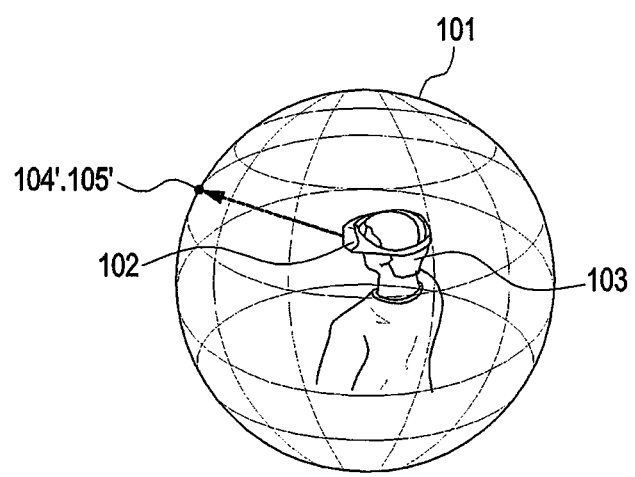
FIG. 4 illustrates a viewing perspective of a VR device, according to an embodiment of the present disclosure.
Figure 5:
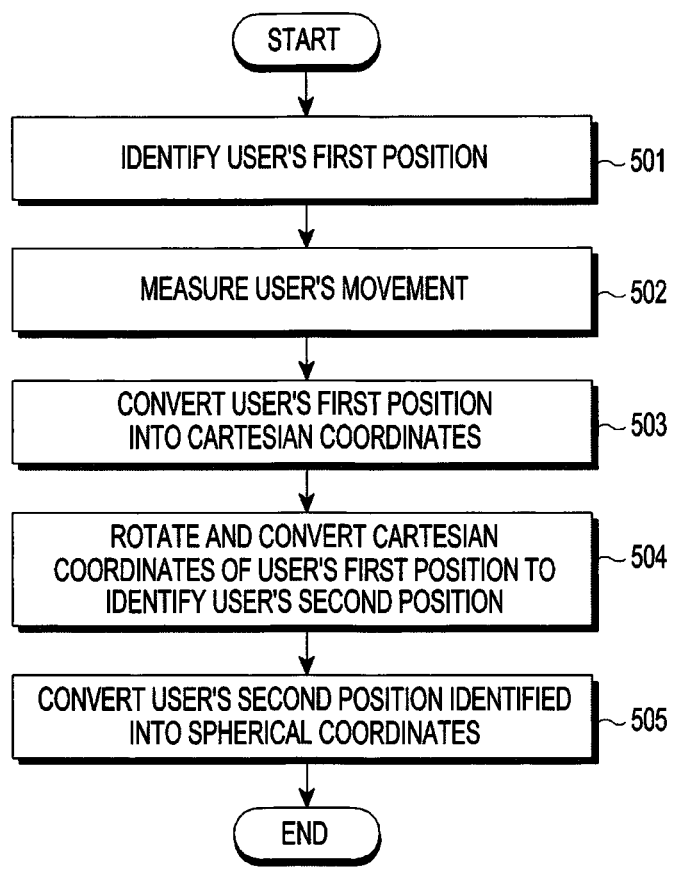
FIG. 5 is a flowchart illustrating a method for operating a VR device, according to an embodiment of the present disclosure.
Figure 6:
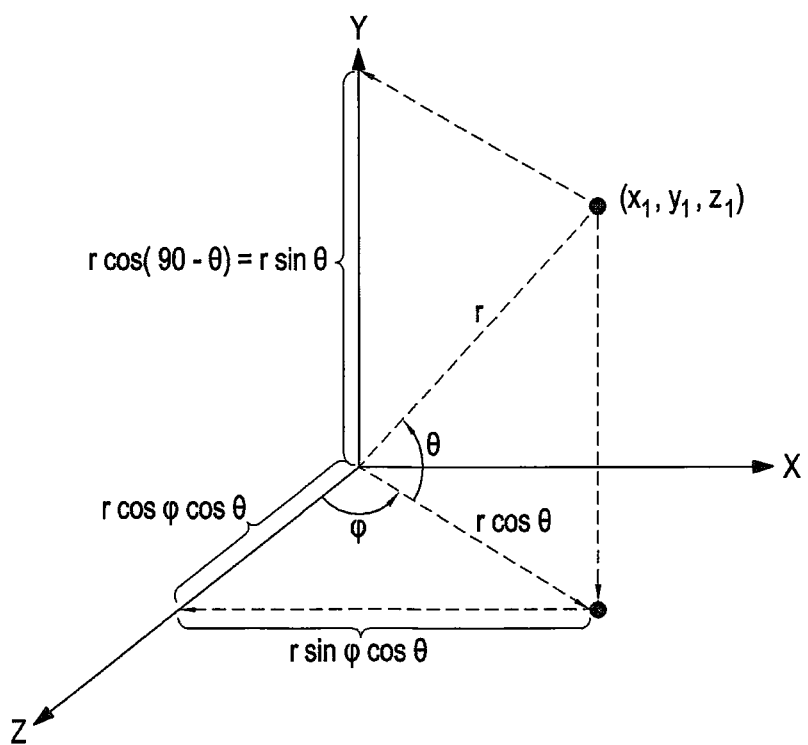
FIG. 6 illustrates a relationship between spherical coordinates and cartesian coordinates in a VR device, according to an embodiment of the present disclosure.

FIG. 4 illustrates a view direction of a VR device, according to an embodiment of the present disclosure. FIG. 5 is a flowchart illustrating a method for operating a VR device, according to an embodiment of the present disclosure. FIG. 6 illustrates a relationship between spherical coordinates and cartesian coordinates in a VR device, according to an embodiment of the present disclosure.

Figure 2:
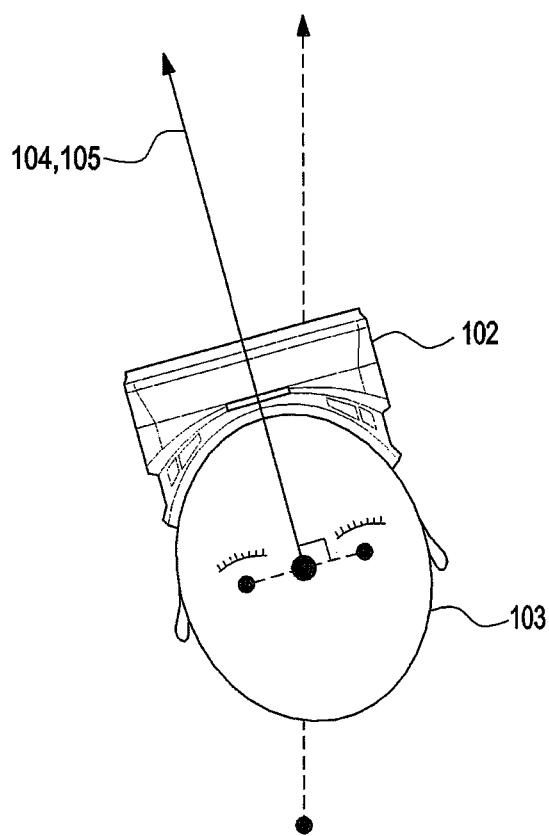
FIG. 2 illustrates a user's viewing perspective in a VR device, according to an embodiment of the present disclosure.

Referring to FIGS. 1 and 2, a user's first viewing perspective 105 is assumed as a reference in a virtual spherical space 101. The user's first viewing perspective 105 may be represented as spherical coordinates (r1, Φ1, θ1). Here, since the r of the virtual spherical space 101 is assumed as 1, the following is assumed: r1=1. The user's first viewing perspective 105 may mean a first viewpoint that is the center point of a first viewport which is an area of the VR content being currently provided to the user 103.

The user 103 wearing the VR device 102 may move her head in various directions while in use of the VR device 102, and according to the movement, the user's viewing perspective may change from the user's first viewing perspective 105 to a user's second viewing perspective 105'. The VR device 102 may provide VR content reflecting the change in the user's viewing perspective. At this time, the movement of the user's viewing perspective should be reflected in the VR content provided to the user 103. The user's second viewing perspective 105' may mean a second viewpoint that is the center point of a second viewport which is an area of the VR content is provided to the user 103 after the user has moved.

Referring to FIGS. 1 to 3 and FIG. 5, the user's first position is identified in step 501. Here, the user's first position means the user's first viewing perspective 105. The user's first position may be a reference point and start point of the VR content, and the user's first position may previously be defined and stored in the VR device, or the user's first position may be measured and obtained by a location sensor. Alternatively, the user's first position may be obtained by reflecting a user's movement measured by a location sensor in a prior position to the first position. In this disclosure, the user's first position is assumed to be identified as spherical coordinates, (1, Φ1, θ1). However, the user's first position may also be identified as cartesian coordinates (x1, x2, x3). In this case, step 503, described below, may be skipped.

Next, the user's movement is measured in step 502. Here, measuring the user's movement may mean measuring the user's movement from the user's first position to the user's second position. In other words, measuring the user's movement may mean measuring the movement of the user's viewing perspective from the user's first viewing perspective 105 to the user's second viewing perspective 105'. The movement of the user's viewing perspective may be measured by the location sensor included in the VR device. The method in which the location sensor measures the user's viewing perspective has been described above, and no detailed description thereof is thus presented below. The movement from the user's first position to the user's second position may be provided as yaw angle α, pitch angle β, and roll angle γ by the location sensor.

To apply the yaw angle α, pitch angle β, and roll angle γ to the user's first position, the user's first position represented as spherical coordinates may be converted into cartesian coordinates in step 503.

Referring to FIG. 6, the cartesian coordinates (x1, y1, z1) converted from the user's first position (r1, Φ1, θ1) may be obtained using Equations (1) to (3) as follows:

$$x_1 = r \sin \varphi \cos \theta \quad \text{Equation (1)}$$

$$y_1 = r \sin \theta \quad \text{Equation (2)}$$

$$z_1 = r \cos \varphi \cos \theta \quad \text{Equation (3)}$$

Here, it may be assumed that r=1.

Steps 501 to 503 need not necessarily follow the order shown in FIG. 5 or as set forth above, and may be performed in a different order, or some of the steps may simultaneously be performed.

Referring again to FIGS. 1 to 3 and FIG. 5, the user's first position cartesian coordinates $X_1=(x1, y1, z1)$ are rotated and converted to identify the user's second position at step 504. Here, the user's second position means the user's second viewing perspective 105'. The conversion from the user's first position to the user's second position may be achieved via use of a rotation matrix. As a yaw angle $\alpha$ rotation matrix ($R_{yaw}$), Equation (4) may be used, and this may be multiplied by the user's first position cartesian coordinates ($X_1$) as represented in Equation (5), obtaining the yaw angle rotation position ($X_{yaw}$).

$$R_{yaw} = \begin{bmatrix} \cos\alpha & 0 & \sin\alpha \\ 0 & 1 & 0 \\ -\sin\alpha & 0 & \cos\alpha \end{bmatrix} \quad \text{Equation (4)}$$

$$X_{yaw} = R_{yaw} X_1$$

$$\begin{bmatrix} x_{yaw} \\ y_{yaw} \\ z_{yaw} \end{bmatrix} = \begin{bmatrix} \cos\alpha & 0 & \sin\alpha \\ 0 & 1 & 0 \\ -\sin\alpha & 0 & \cos\alpha \end{bmatrix} \begin{bmatrix} x_1 \\ y_1 \\ z_1 \end{bmatrix} \quad \text{Equation (5)}$$

As a pitch angle $\beta$ rotation matrix ($R_{pitch}$), Equation (6) may be used, and this may be multiplied by the user's yaw angle rotation position ($X_{yaw}$) as represented in Equation (7), obtaining the pitch angle rotation position ($X_{pitch}$).

$$R_{pitch} = \begin{bmatrix} 1 & 0 & 0 \\ 0 & \cos\beta & -\sin\beta \\ 0 & \sin\beta & \cos\beta \end{bmatrix} \quad \text{Equation (6)}$$

$$X_{pitch} = R_{pitch} X_{yaw}$$

$$\begin{bmatrix} x_{pitch} \\ y_{pitch} \\ z_{pitch} \end{bmatrix} = \begin{bmatrix} 1 & 0 & 0 \\ 0 & \cos\beta & -\sin\beta \\ 0 & \sin\beta & \cos\beta \end{bmatrix} \begin{bmatrix} x_{yaw} \\ y_{yaw} \\ z_{yaw} \end{bmatrix} \quad \text{Equation (7)}$$

As shown in FIG. 3, the roll angle $\gamma$ may be 0, and the user's movement may be represented with only yaw angle $\alpha$ and pitch angle $\beta$. In this case, the user's second position cartesian coordinates may be obtained as follows: $X_2=(x2, y2, z2)=X_{pitch}$.

In some cases, it is necessary to convert the roll angle $\gamma$, in which case the yaw angle $\alpha$ rotation matrix ($R_{yaw}$) and the pitch angle $\beta$ rotation matrix ($R_{pitch}$) may properly be multiplied to obtain the roll angle $\gamma$ rotation matrix ($R_{roll}$).

The roll angle $\gamma$ rotation matrix ($R_{roll}$) is as represented in Equation (8), and may be multiplied by the user's pitch angle rotation position ($X_{pitch}$) as represented in Equation (9), to obtain the roll angle rotation position ($X_{roll}$).

$$\begin{aligned} R_{roll}(\gamma) &= R_{pitch}(90°)R_{yaw}(\gamma)R_{pitch}(-90°) \\ &= \begin{bmatrix} 1 & 0 & 0 \\ 0 & \cos 90° & -\sin 90° \\ 0 & \sin 90° & \cos 90° \end{bmatrix} \begin{bmatrix} \cos\gamma & 0 & \sin\gamma \\ 0 & 1 & 0 \\ -\sin\gamma & 0 & \cos\gamma \end{bmatrix} \begin{bmatrix} 1 & 0 & 0 \\ 0 & \cos(-90°) & -\sin(-90°) \\ 0 & \sin(-90°) & \cos(-90°) \end{bmatrix} \\ &= \begin{bmatrix} 1 & 0 & 0 \\ 0 & 0 & -1 \\ 0 & 1 & 0 \end{bmatrix} \begin{bmatrix} \cos\gamma & 0 & \sin\gamma \\ 0 & 1 & 0 \\ -\sin\gamma & 0 & \cos\gamma \end{bmatrix} \begin{bmatrix} 1 & 0 & 0 \\ 0 & 0 & 1 \\ 0 & -1 & 0 \end{bmatrix} \\ &= \begin{bmatrix} \cos\gamma & 0 & \sin\gamma \\ \sin\gamma & 0 & -\cos\gamma \\ 0 & 1 & 0 \end{bmatrix} \begin{bmatrix} 1 & 0 & 0 \\ 0 & 0 & 1 \\ 0 & -1 & 0 \end{bmatrix} \\ &= \begin{bmatrix} \cos\gamma & -\sin\gamma & 0 \\ \sin\gamma & \cos\gamma & 0 \\ 0 & 0 & 1 \end{bmatrix} \end{aligned} \quad \text{Equation (8)}$$

$$X_{roll} = R_{roll} X_{pitch} \quad \text{Equation (9)}$$

In this case, the user's second position cartesian coordinates may be obtained as follows: $X_2 = X_{roll}$.

The order of multiplying the rotation matrix is not limited to that shown above as long as at least one of an order of multiplying a yaw angle rotation matrix, pitch angle rotation matrix, is defined; or a roll angle rotation matrix for the yaw angle, pitch angle, or roll angle rotation axis reference used in the internal system of one VR device is defined.

As set forth above, an embodiment of the present disclosure is also possible where the yaw angle means an angle at which the user's viewing perspective rotates around the z axis, the pitch angle means an angle at which the user's viewing perspective rotates around the y axis, and the roll angle means an angle at which the user's viewing perspective rotates around the x axis.

In this case, Equation (10) may be used as yaw angle rotation matrix ($R_{yaw}$) for rotation by p around the z axis.

$$R_{yaw}(p) = \begin{bmatrix} \cos p & -\sin p & 0 \\ \sin p & \cos p & 0 \\ 0 & 0 & 1 \end{bmatrix} \quad \text{Equation (10)}$$

Equation (11) may be used as pitch angle rotation matrix ($R_{pitch}$) for rotation by q around the y axis.

$$R_{pitch}(q) = \begin{bmatrix} \cos q & 0 & \sin q \\ 0 & 1 & 0 \\ -\sin q & 0 & \cos q \end{bmatrix} \quad \text{Equation (11)}$$

Equation (12) may be used as roll angle rotation matrix ($R_{roll}$) for rotation by v around the x axis.

$$R_{roll}(v) = \begin{bmatrix} 1 & 0 & 0 \\ 0 & \cos v & -\sin v \\ 0 & \sin v & \cos v \end{bmatrix} \quad \text{Equation (12)}$$

In this case, the user's second position cartesian coordinates, $X_2 = (x2, y2, z2)$, may be obtained as shown in Equation (13).

$$X_2 = R_{roll}(v) R_{pitch}(q) R_{yaw}(p) X_1 \quad \text{Equation (13)}$$

$$\begin{bmatrix} x_2 \\ y_2 \\ z_2 \end{bmatrix} = \begin{bmatrix} \cos q \cos v & -\cos q \sin v & \sin q \\ \cos p \sin v + \sin p \sin q \cos v & \cos p \cos v - \sin p \sin q \sin v & -\sin p \cos q \\ \sin p \sin v - \cos p \sin q \cos v & \sin p \cos v + \cos p \sin q \sin v & \cos p \cos q \end{bmatrix} \begin{bmatrix} x_1 \\ y_1 \\ z_1 \end{bmatrix}$$

Although in the above embodiment of the present disclosure, the user's first position cartesian coordinates, $X_1 = (x1, y1, z1)$, are multiplied by the yaw angle rotation matrix ($R_{yaw}(p)$), pitch angle rotation matrix ($R_{pitch}(q)$), and the roll angle rotation matrix ($R_{roll}(v)$) in the order thereof to obtain the user's second cartesian coordinates, $X_2 = (x2, y2, z2)$, the order of multiplying the rotation matrices is not limited thereto, as long as an order of multiplying the roll angle rotation matrix, pitch angle rotation matrix, and roll angle rotation matrix for the yaw angle, pitch angle, and roll angle rotation axis references used in the internal system of one VR device is defined.

When the angle at which the yaw angle rotates around the z axis, the pitch angle rotates around the y axis, and the roll angle rotates around the x axis in the internal system of the VR device, the location sensor is set to measure or obtain the user's movement in the order of yaw angle (p), pitch angle (q), and roll angle (v) such that the user's first cartesian coordinates ($X_1$) may be multiplied by the roll angle rotation matrix ($R_{yaw}(p)$), pitch angle rotation matrix ($R_{pitch}(q)$), and roll angle rotation matrix ($R_{roll}(v)$ in the order thereof, obtaining the user's second position cartesian coordinates. $X_2 = (x2, y2, z2)$.

Next, the user's identified second position cartesian coordinates ($X_2$) are converted into the spherical coordinates (r2, Φ2, θ2) at step 505.

The user's second position cartesian coordinates, $X_2 = (x2, y2, z2)$, may be converted into the user's second position spherical coordinates (r2, Φ2, θ2) using Equations (14) to (16). Here, it be assumed that r2=1.

$$r_2 = \sqrt{x_2^2 + y_2^2 + z_2^2} \quad \text{Equation (14)}$$

$$\varphi_2 = \tan^{-1} \frac{x_2}{z_2} \times \frac{180°}{\pi} \quad \text{Equation (15)}$$

$$\theta_2 = -\sin^{-1} \frac{y_2}{r_2} \times \frac{180°}{\pi} \quad \text{Equation (16)}$$

Here, the reason why Equations (15) and (16) are multiplied by $$\frac{180°}{\pi}$$

is to match the radian value to the degree value.

Where z2 is 0 in Equation (15), any value may be used as z2.

In the case where calculation is impossible, such as when z2 is represented as in Equations (17) and (18), or if it is ambiguous to specify a resultant value given the diverging form of the graph of $\tan^{-1}$, the rule may be defined to use a particular value.

$$\varphi_2 = a\tan2(x_2, z_2) \times \frac{180°}{\pi} \quad \text{Equation (17)}$$

-continued $$a\tan2(x, z) = \begin{cases} \tan^{-1}\left(\frac{x}{z}\right), & \text{if } z > 0 \\ \tan^{-1}\left(\frac{x}{z}\right) + \pi, & \text{if } z < 0, x \geq 0 \\ \tan^{-1}\left(\frac{x}{z}\right) - \pi, & \text{if } z < 0, x < 0 \\ \frac{\pi}{2}, & \text{if } z = 0, x > 0 \\ -\frac{\pi}{2}, & \text{if } z = 0, x < 0 \\ 0, & \text{if } z = 0 \text{ and } x = 0 \end{cases} \quad \text{Equation (18)}$$

Conversion among Equations (16) to (18) as per coordinate axes is described below with reference to FIG. 7.

Figure 7:
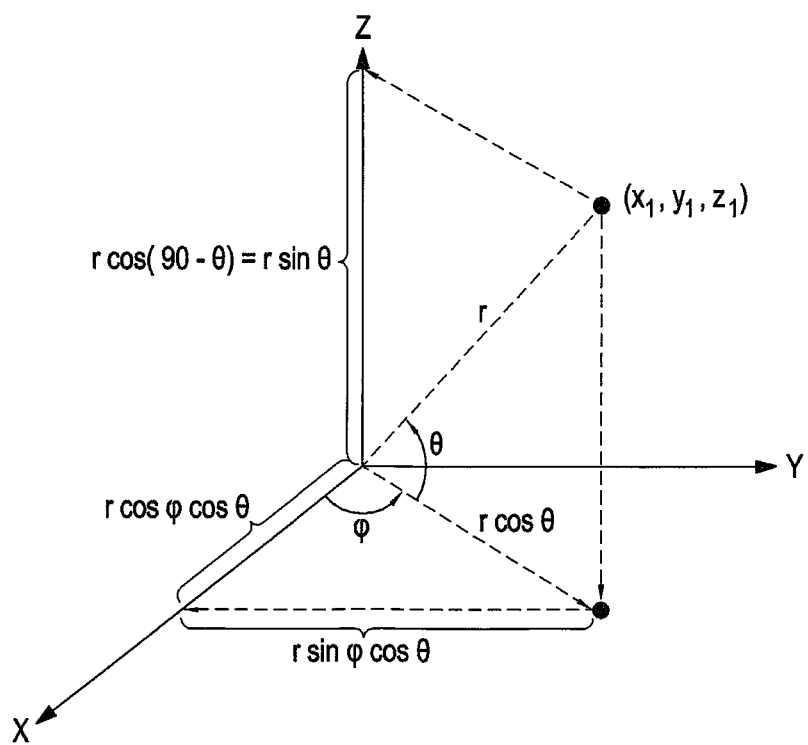
FIG. 7 illustrates coordinate axes, according to an embodiment of the present disclosure.

FIG. 7 illustrates coordinate axes, according to an embodiment of the present disclosure.

For the coordinate axes shown in FIG. 7, Equations (16) to (18) may be represented as Equations (19) to (21).

$$\theta_2 = \sin^{-1} z_2 \times \frac{180°}{\pi} \quad \text{Equation (19)}$$

$$\varphi_2 = a\tan2(y_2, x_2) \times \frac{180°}{\pi} \quad \text{Equation (20)}$$

$$a\tan2(y, x) = \begin{cases} \tan^{-1}\left(\frac{y}{x}\right), & \text{if } x > 0 \\ \tan^{-1}\left(\frac{y}{x}\right) + \pi, & \text{if } x < 0, y \geq 0 \\ \tan^{-1}\left(\frac{y}{x}\right) - \pi, & \text{if } x < 0, y < 0 \\ \frac{\pi}{2}, & \text{if } x = 0, y > 0 \\ -\frac{\pi}{2}, & \text{if } x = 0, y < 0 \\ 0, & \text{if } x = 0 \text{ and } y = 0 \end{cases} \quad \text{Equation (21)}$$

Upon obtaining the user's second position spherical coordinates (r2, Φ2, θ2), the VR device may provide the user with the area corresponding to the user's second position spherical coordinates (r2, Φ2, θ2) of the VR content.

The area corresponding to the user's second position spherical coordinates (r2, Φ2, θ2) may be an area corresponding to the field of view (FOV) of the VR device with respect to the point corresponding to the user's second position spherical coordinates (r2, Φ2, θ2) specified on the projection structure of the VR content. Or, the area corresponding to the user's second position spherical coordinates (r2, Φ2, θ2) may be an area corresponding to the area of the viewport of the VR device with respect to the point corresponding to the user's second position on the projection structure. Alternatively, the area corresponding to the user's second position spherical coordinates (r2, Φ2, θ2) may be an area pre-determined in upper-lower and left-right ranges with respect to the point corresponding to the user's second position on the projection structure. On the other hand, the area corresponding to the user's second position spherical coordinates (r2, Φ2, θ2) may be an area specified by the second position of N samples obtained by applying a rotation matrix, as in the method of applying N sample points, around the user's viewing perspective, to the user's viewing perspective.

The area corresponding to the user's second position spherical coordinates (r2, Φ2, θ2) of the VR content may be specified as long as the VR content is provided so that the point corresponding to the user's second position spherical coordinates (r2, Φ2, θ2) of the VR content is positioned at or near the center of the FOV of the user gazing in the second user's viewing perspective.

VR content may be stored in a memory of the VR device, and the area corresponding to the user's second position spherical coordinates of the VR content may be provided to the user. VR content may be stored in a server, and when the VR device transmits the user's first position spherical coordinates information and the user's movement information to the server, the server calculates the second position cartesian coordinates and provides the VR content of the area corresponding to the second position cartesian coordinates to the VR device. When the VR device transmits second position cartesian coordinates information to the server, the server may transmit the VR content of the area corresponding thereto to the VR device.

A method for obtaining the user's second position spherical coordinates when the user's identified second position cartesian coordinates correspond to a polar value is described below with reference to FIGS. 8 and 9, according to an embodiment of the present disclosure.

Figure 8:
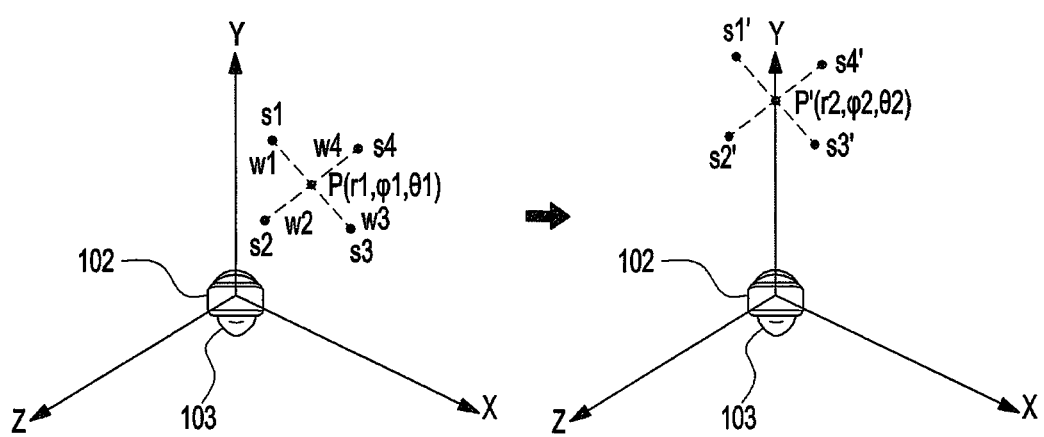
FIG. 8 schematically illustrates a method for obtaining spherical coordinates of an identified user's second position using an ambient sample when the cartesian coordinates of the user's second position correspond to a polar value, according to an embodiment of the present disclosure.
Figure 9:
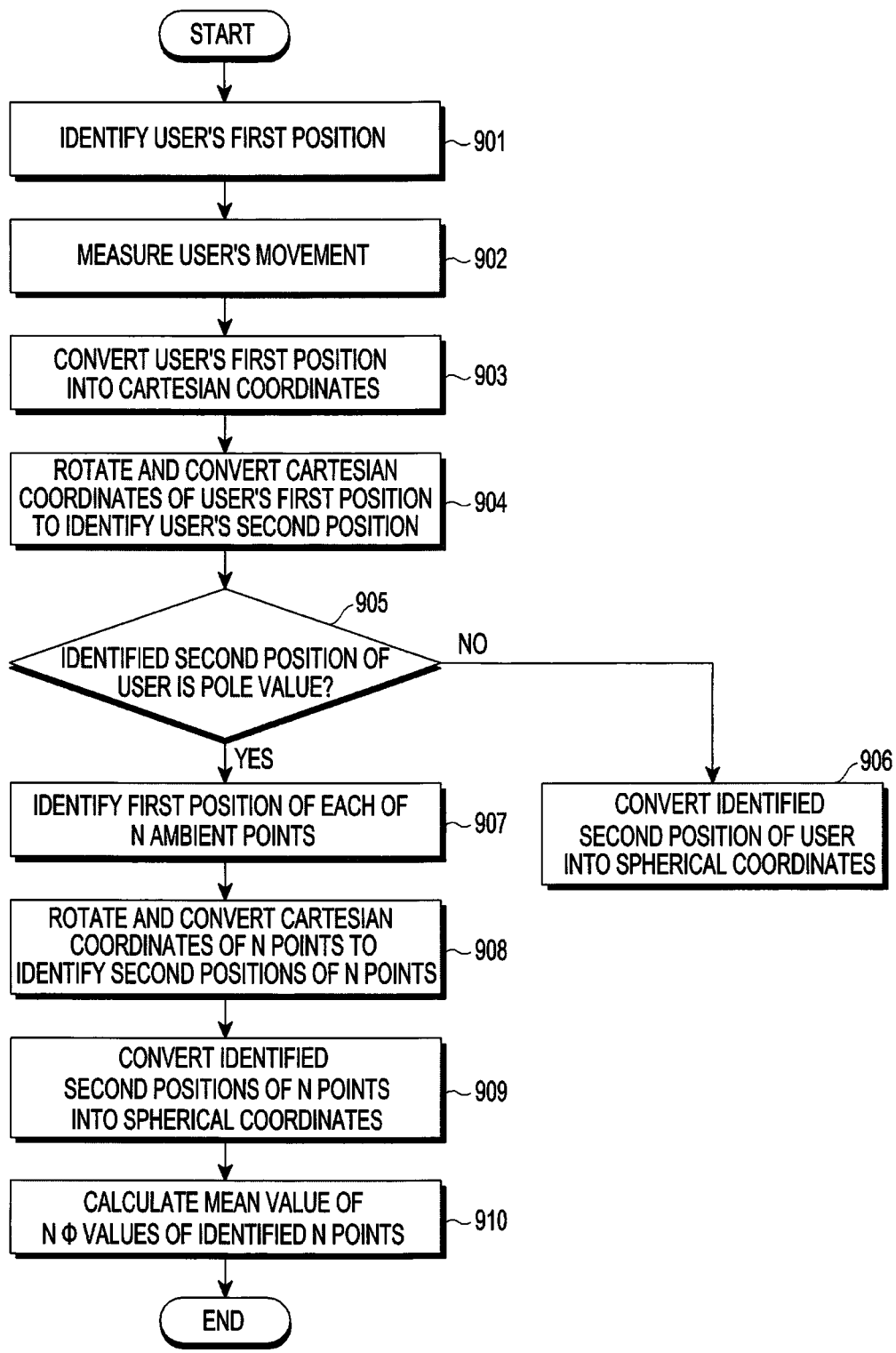
FIG. 9 is a flowchart illustrating a method for operating a VR device, according to an embodiment of the present disclosure.

FIG. 8 schematically illustrates a method for obtaining spherical coordinates of an identified user's second position using an ambient sample when the cartesian coordinates of the user's second position correspond to a polar value. FIG. 9 is a flowchart illustrating a method for operating a VR device, according to an embodiment of the present disclosure.

The polar value refers to the direction up the user's head and may be a value on the y axis, which is directed up from the head of the user 103 wearing the VR device 102 as shown in FIG. 8. In other words, when the user's second position cartesian coordinates are (0, 0, y2) on the y axis, the user may be said to be position at the polar value. However, the polar value is not limited to any value on the y axis, and the polar value may be determined as a different value depending on coordinate axes or the plane where the user is positioned. For example, when the user is positioned on the xy plane and the z axis is directed up the user's head, a value on the z axis may become the polar value.

Obtaining the user's second position spherical coordinates (r2, Φ2, θ2) when the user's second position Cartesian coordinates are (0, 0, y2) on the y axis will be described. r2 may be assumed to be 1.

The step 901 of identifying the user's first position, the step 902 of measuring the user's movement, the step 903 of converting the user's first position represented as spherical coordinates into cartesian coordinates, and the step 904 of rotating and converting the user's first position cartesian coordinates to identify the user's second position may be performed as described above with reference to the aforementioned embodiments.

Next, in step 905, it is determined whether the user's second position identified is the polar value. Unless the user's second cartesian coordinates are the polar value, the user's second position cartesian coordinates identified are simply converted into spherical coordinates in 905.

However, where the user's second position cartesian coordinates are P'=(0, 0, y2), the first positions of N points around the user's first position cartesian coordinates P are identified in step 907. In FIG. 8, four points s1, s2, s3, and s4 are selected around the user's first position cartesian coordinates P.

Next, the aforementioned rotation matrix are applied to each of the four points s1, s2, s3, and s4 around the user's first position cartesian coordinates P, identifying the second positions s1', s2', s3', and s4' of the four points in step 908.

Then, the second positions s1', s2', s3', and s4' of the four points are converted into spherical coordinates in step 909. The second positions s1', s2', s3', and s4' of the four points may be converted into spherical coordinates by the method for converting cartesian coordinates into spherical coordinates as set forth above.

Four second position Φ values (Φs1', Φs2', Φs3', Φs4') may be obtained from the spherical coordinates of the second positions of the four points. A mean value is calculated for the four second position Φ values in step 910. The mean value of the four second position Φ values may be obtained using Equations (22) to (25).

$$d_i = \|P - s_i\|$$ Equation (22)

$$w_i = \frac{e^{-d_i}}{\sum_{k=1}^{n} e^{-d_k}}$$ Equation (23)

$$1 = \sum_{i=1}^{n} w_i$$ Equation (24)

$$\varphi_{avg} = \sum_{i=1}^{n} w_i \varphi_{s_i'}$$ Equation (25)

$W_i$ denotes the weight and $W_i$ may be set to be inverse-proportional to the distance from the user's first position cartesian coordinates P.

By assuming that $\varphi_{avg}$ corresponds to Φ2 of the spherical coordinates (1, Φ2, θ2) of the user's second position P' and obtaining θ2 using Equation (16), the spherical coordinates (1, Φ2, θ2) of the user's second position P' may be obtained.

A method for producing VR content is described below with reference to FIGS. 10 to 12, according to an embodiment of the present disclosure.

FIGS. 10A-10D schematically illustrate a method for producing VR content, according to an embodiment of the present disclosure. FIG. 11A-11C illustrate a device for capturing images to produce visual content contained in VR content, according to an embodiment of the present disclosure. FIGS. 12A-12C illustrate examples of 2D projection methods and 2D projection images.

Figure 10A:
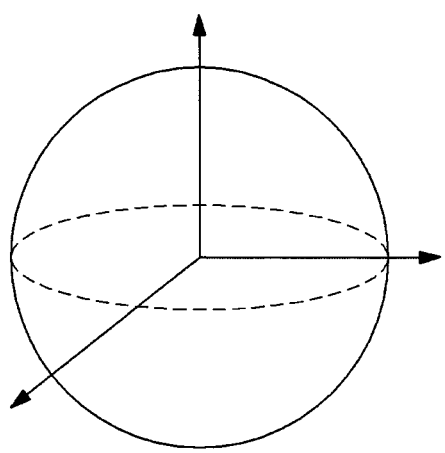
FIGS. 10A-10D schematically illustrate a method for producing VR content, according to an embodiment of the present disclosure.
Figure 10B:
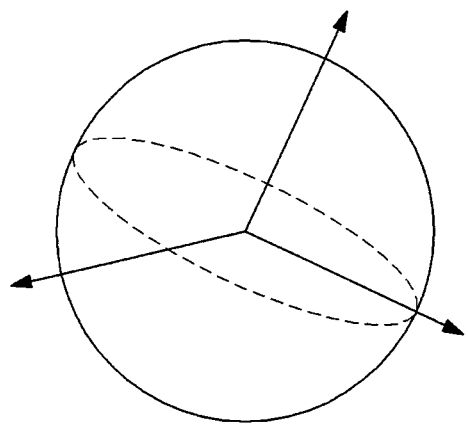

First, captured images may be stitched to a virtual spherical projection structure as shown in FIG. 10A. Stitching may mean arraying captured images to cover the surface of the projection structure. Images may be captured in various directions to project to the spherical projection structure as shown in FIG. 10A.

Referring to FIG. 11, images may be captured by a tetrahedron camera having a camera in each surface as shown in FIG. 11A. Images may be captured by a cube camera having a camera in each surface as shown in FIG. 11B. Images may be captured by a dodecahedron camera having a camera in each surface as shown in FIG. 11C. However, other various devices and methods may also be adopted as long as they may capture images in various directions.

Referring back to FIG. 10B, when a plurality of captured multi-directional images are stitched onto the surface of the virtual spherical projection structure as shown in FIG. 10A, the coordinate axes of the virtual spherical projection structure may be rotated as shown in FIG. 10B. The rotation of the coordinate axes of the spherical projection structure may be carried out when the user's view point is moved. Methods described according to the embodiments in connection with FIGS. 1 to 7 may be applied to rotate the coordinate axes of the virtual spherical projection structure.

Figure 10C:
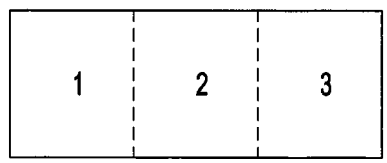

After rotating the images-stitched virtual spherical projection structure, the images stitched on the virtual spherical projection structure are converted into two-dimensional (2D) projection images (or pictures) as shown in FIG. 10C.

A method for converting a 2D projection image is described with reference to FIG. 12A. Images stitched on the virtual spherical projection structure may be attached together on a tetrahedron 2D plane, producing a 2D projection image 1201. The images stitched on the virtual spherical projection structure may be captured by a tetrahedron camera.

Images stitched on the virtual spherical projection structure may be attached together on a 2D plane, producing a cube 2D projection image 1202. At this time, the images stitched on the virtual spherical projection structure may be captured by a cube camera. FIG. 12B illustrates an example of the cube 2D projection image 1202.

Images stitched on the virtual spherical projection structure may be attached together on a 2D plane, producing an octahedron 2D projection image 1203. The images stitched on the virtual spherical projection structure may be captured by an octahedron camera.

Images stitched on the virtual spherical projection structure may be attached together on a 2D plane, producing a dodecahedron 2D projection image 1204. The images stitched on the virtual spherical projection structure may be captured by a dodecahedron camera.

Images stitched on the virtual spherical projection structure may be attached together on a 2D plane, producing an icosahedron 2D projection image 1205, as shown in FIG. 12C. The images stitched on the virtual spherical projection structure may be captured by an icosahedron camera.

Any other method for producing a 2D projection image may also be adopted which may capture images in various directions and project the images to a 2D plane.

An example of a system for converting images stitched on the spherical position into a 2D projection image may be one as represented in Table 1.

TABLE 1

5.1.1 Equirectangular projection for one sample location
Inputs to this clause are:
    pictureWidth and pictureHeight, which are the width and height,
    respectively, of a monoscopic projected luma picture, in luma
    samples, and
    the center point of a sample location (i, j) along the horizontal and
    vertical axes, respectively.
Outputs of this clause are:
    sphere coordinates ($\phi$, $\theta$) for the sample location in degrees relative
    to the coordinate axes specified in 5.1.
The sphere coordinates ($\phi$, $\theta$) for the luma sample location, in degrees, are
given by the following equations:
    $\phi = (0.5 - i \div \text{picture Width}) * 360$
    $\theta = (0.5 - j \div \text{pictureHeight}) * 180$ Referring back to FIG. 10D, the 2D projection image may be packed, producing a packed image (or picture). Packing is the method of dividing a 2D projection image into regions and remapping them. Packing may include transforming, resizing, and relocating. Packing may be performed to transmit VR content in a motion picture experts group (MPEG) media transport (MMT) method or MPEG dynamic adaptive streaming over hyper text transfer protocol (HTTP) (DASH) method.

Figure 10D:
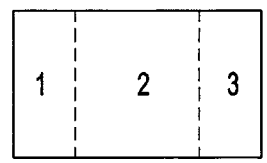

Upon packing the 2D projection image, a weight may be assigned per location as shown in FIG. 10D, which may be related to one obtained by conducting packing with a weight assigned to a second region, but not to a first region and third region. The user's viewpoint may be positioned in the second region. The center of the 2D projection image or packed image may be subject to a smaller loss than the edges when the image is restored.

Various packing methods may be adopted. For example, the overall 2D projection image may be packed, or the area from the shifted user's viewpoint to the viewport or FOV may be packed. Further, other content information, such as auditory content, may be packed together.

The packed data may be VR content, and may be transmitted from the server to the VR device in an MMT method or DASH method.

Upon receiving the packed data, the VR device may perform the operations of producing the packed data in reverse order to render the VR content.

The VR device may unpack the packed data. An example of a system for unpacking the packed data may be one as represented in Table 2, Table 3, and Table 4.

TABLE 2

5.4 Conversion of sample locations for rectangular region-wise packing
Inputs to this clause are:
    sample location (x, y) within the packed region in integer sample units;
    the width and the height of the region in the projected picture in sample units (projRegWidth,
    projRegHeight);
    the width and the height of the region in the packed picture in sample units (packedRegWidth,
    packedRegHeight);
    transform type (transformType); and
    offset values for sampling position (offsetX, offsetY).
Outputs of this clause are:
    the center point of the sample location (i, j) within the projected region in sample units.
The outputs are derived as follows:
    if( transformType = =0 | | transformType = =1 | | transformType = =2 | | transformType = = 3 ) {
        horRatio = projRegWidth ÷ packedRegWidth TABLE 2-continued

```
        verRatio = projRegHeight ÷ packedRegHeight
    } else if ( transformType = = 4 | | transformType = = 5 transformType = = 6 | |
        transformType = = 7 ) {
        horRatio = projRegWidth ÷ packedRegHeight
        verRatio = projRegHeight ÷ packedRegWidth
    }
    if( transformType = = 0 ) {
        i = horRatio * ( x + offsetX )
        j = verRatio * ( y + offsetY )
    } else if ( transformType = = 1 ) {
        i = horRatio * ( packedRegWidth - x - offsetX )
        j = verRatio * ( y + offsetY )
    } else if ( transformType = = 2 ) {
        i = horRatio * ( packedRegWidth - x - offsetX )
        j = verRatio * ( packedRegHeight - y - offsetY )
    } else if (transformType = = 3 ) {
        i = horRatio * ( x + offsetX )
        j = verRatio * ( packedRegHeight - y - offsetY )
    } else if (transformType = = 4 ) {
        i = horRatio * ( y- offsetY )
        j = verRatio * ( x+ offsetX )
    } else if ( transformType = = 5 ) {
        i = horRatio * ( y + offsetY )
        j = verRatio ( packedRegWidth - x - offsetX )
    } else if (transformType = = 6 ) {
        i = horRatio * ( packedRegHeight - y - offsetY )
        j = verRatio * ( packedRegWidth - x - offsetX )
    } else if (transformType = = 7 ) {
        i = horRatio * ( packedRegHeight - y - offsetY )
        j = verRatio * ( x+ offsetX )
    }
}
```

TABLE 3

7.2.1.2 Mapping of luma sample locations within a decoded picture to angular coordinates relative to
the global coordinate axes
The width and height of a monoscopic projected luma picture (pictureWidth and pictureHeight, respectively) are
derived as follows:
    The variables HorDiv and VerDiv are derived as follows:
      If StereoVideoBox is absent, HorDiv and VerDiv are set equal to 1.
      Otherwise, if StereoVideoBox is present and indicates side-by-side frame packing, HorDiv is
      set equal to 2 and VerDiv is set equal to 1.
      Otherwise (StereoVideoBox is present and indicates top-bottom frame packing), HorDiv is set
      equal to 1 and VerDiv is set equal to 2.
    If RegionWisePackingBox is absent, pictureWidth and pictureHeight are set to be equal to
    width / HorDiv and height / VerDiv, respectively, where width and height are syntax elements of
    VisualSampleEntry.
    Otherwise, pictureWidth and pictureHeight are set equal to proj_picture_width and
    proj_picture_height, respectively.

TABLE 4

If RegionWisePackingBox is present, the following applies for each region n in the range of 0 to
num_regions:
  For each sample location (xPackedPicture, yPackedPicture) belonging to the n-th region with
  packing_type[n] equal to 0 (i.e., with rectangular region-wise packing), the following applies:
    The corresponding sample location (xProjPicture, yProjPicture) of the projected picture is derived
    as follows:
      x is set equal to xPackedPicture - packed_reg_left[n]
      y is set equal to yPackedPicture - packed_reg_top[n]
      offsetX is set equal to 0.5
      offsetY is set equal to 0.5
      Clause 5.4 is invoked with x, y, packed_reg_width[n],
      packed_reg_height[n], proj_reg_width[n], proj_reg_height[n],
      transform_type[n], offsetX and offsetY as inputs, and the output is assigned to
      sample location (i, j).
      xProjPicture is set equal to proj_reg_left[n] +i
      When xProjPicture is greater than or equal to proj_picture_width, xProjPicture is
      set equal to xProjPicture - proj_picture_width.
      yProjPicture is set equal to proj_reg_top[n] -j
    Clause 7.2.2.4 is invoked with xProjPicture, yProjPicture, pictureWidth, and pictureHeight as
    inputs, and the outputs indicating the angular coordinates and the constituent frame index (for
    frame-packed stereoscopic video) for the luma sample location (xPackedPicture, yPackedPicture)
    belonging to the n-th region in the decoded picture.

TABLE 4-continued

Otherwise, the following applies for each sample location (x, y) within the decoded picture:
    xProjPicture is set equal to x + 0.5
    yProjPicture is set equal to y + 0.5
    Clause 7.2.2.4 is invoked with xProjPicture, yProjPicture, pictureWidth, and pictureHeight as inputs, and
    the outputs indicating the angular coordinates and the constituent frame index (for frame-packed
    stereoscopic video) for the sample location (x, y) within the decoded picture.

The VR device may receive, from the server, information for unpacking the packed data. An example of the information for unpacking may be shown in Table 5.

TABLE 5

```
7.2.4           Region-wise packing box
7.2.4.1         Definition
Box Type:                 'rwpk'
Container:                Scheme Information box ('achi')
Mandatory:                No
Quantity:                 Zero or one
RegionWisePackingBox indicates that projected pictures are packed
region-wise and require unpacking prior to rendering.
7.2.4.2 Syntax
aligned(8) class RegionWisePackingBox extends Fullbox('rwpk', 0, 0) {
    RegionWisePackingStruct( );
}
aligned(8) class RegionWisePackingStruct {
    unsigned int(8) num_regions;
    unsigned int(16) proj_picture_width;
    unsigned int(16) proj_picture_height;
    for (i = 0; i < num_regions; i++) {
        bit(3) reserved = 0;
        unsigned int(1) guard_band_flag[i];
        unsigned int(4) packing_type[i];
        if (guard_band_flag[i] {
            unsigned int(8) left_gb_width[i];
```

TABLE 5-continued

```
            unsigned int(8) right_gb_width[i];
            unsigned int(8) top_gb_height[i];
            unsigned int(8) bottom_gb_height[i];
            unsigned int(1) gb_not_used_for_pred_flag[i];
            unsigned int(3) gb_type[i];
            bit(4) reserved = 0;
        }
        if (packing_type[i] == 0)
            RectRegionPacking(i);
    }|
}
aligned(8) class RectRegionPacking(i) {
    unsigned int(16) proj_reg_width[i];
    unsigned int(16) proj_reg_height[i];
    unsigned int(16) proj_reg_top[i];
    unsigned int(16) proj_reg_left[i1;
    unsigned int(3) transform_type[i];
    bit(5) reserved = 0;
    unsigned int(16) packed_reg_width[i];
    unsigned int(16) packed_reg_height[i];
    unsigned int(16) packed_reg_top[i];
    unsigned int(16) packed_reg_left[i];
}
```

The semantic shown in Table 5 may be the same as that shown in Table 6, Table 7 or Table 8.

TABLE 6

7.2.4.3 Semantics
    num_regions specifies the number of packed regions. Value 0 is reserved.
    proj_picture_width and proj_picture_height specify the width and height, respectively, of the
        projected picture. proj_picture_width and proj_picture_height shall be greater than 0
    guard_band_flag[i] equal to 0 specifies that the i-th region does not have a guard band.
        guard_band_flag[i] equal to 1 specifies that the i-th region has a guard band.
    packing_type[i] specifies the type of region-wise packing. packing_type[i] equal to 0 indicates
        rectangular region-wise packing. Other values are reserved.
    left_gb_width[i] specifies the width of the guard band on the left side of the i-th region in units of two
        luma samples.
    right_gb_width[i] specifies the width of the guard band on the right side of the i-th region in units of two
        luma samples.
    top_gb_width[i] specifies the height of the guard band above the i-th region in units of two luma samples.
    bottom_gb_width[i] specifies the height of the guard band below the i-th region in units of two luma
        samples.
    When guard_band_flag[i] is equal to 1, left_gb_width[i], right_gb_width[i],
        top_gb_width[i], or bottom_gb_width[i] shall be greater than 0.
    The i-th region, including its guard bands, if any, shall not overlap with any other region, including its guard
        bands.
    gb_not_used_for_pred_flag[i] equal to 0 specifies that the guard bands may or may not be used in
        the inter prediction process. gb_not_used_for_pred_flag[i] equal to 1 specifies that the sample
        values of the guard bands are not in the inter prediction process.
NOTE 1:
When gb_not_used_for_pred_flag[i] is equal to 1, the sample values within guard bands in decoded pictures can be rewritten even if the decoded pictures were used as references for inter prediction of subsequent pictures to be decoded. For example, the content of a region can be seamlessly expanded to its guard band with decoded and reprojected samples of another region.

TABLE 7 gb_type[i] specifies the type of the guard bands for the i-th region as follows:
    gb_type[i] equal to 0 specifies that the content of the guard bands in relation to the content of the
        regions is unspecified. gb_type shall not be equal to 0, when gb_not_used_for_pred_flag is
        equal to 0.
    gb_type[i] equal to 1 specifies that the content of the guard bands suffices for interpolation of sub-
        pixel values within the region and less than one pixel outside of the region boundary.

TABLE 7-continued

NOTE 2: gb_type equal to 1 can be used when the boundary samples of a region have been copied horizontally
or vertically to the guard band.
gb_type[i] equal to 2 specifies that the content of the guard bands represents actual image content at
quality that gradually changes from the picture quality of the region to that of the spherically adjacent
region.
gb_type[i] equal to 3 specifies that the content of the guard bands represents actual image content at
the picture quality of the region.
gb_type[i] values greater than 3 are reserved.
proj_reg_width[i], proj_reg_height[i], proj_reg_top[i] and proj_reg_left[i] are
indicated in units of pixels in a projected picture with width and height equal to proj_picture_width
and proj_picture_height, respectively.
proj_reg_width[i] specifies the width of the i-th region of the projected picture.
proj_reg_width[i] shall be greater than 0.
proj_reg_height[i] specifies the height of the i-th region of the projected picture.
proj_reg_height[i] shall be greater than 0.
proj_reg_top[i] and proj_reg_left[i] specify the top sample row and the left-most sample column
in the projected picture. The values shall be in the range from 0, inclusive, indicating the top-left corner of
the projected picture, to proj_picture_height and proj_picture_width, exclusive,
respectively.
proj_reg_width[i] and proj_reg_left[i] shall be constrained such that proj_reg_width[i]
+ proj_reg_left[i] is less than proj_picture_width.
proj_reg_height[i] and proj_reg_top[i] shall be constrained such that proj_reg_height[i]
+ proj_reg_top[i] is less than proj_picture_height.
When the projected picture is stereoscopic, proj_reg_width[ i], proj_reg_height[i],
proj_reg_top[i] and proj_reg_left[i] shall be such that the region identified by these fields
on the projected picture is within a single constituent picture of the projected picture.

TABLE 8 transform_type[i] specifies the rotation and mirroring that has been applied to the i-th region of a
projected picture to map it to the packed picture before encoding When transform_type[i] specifies
both rotation and mirroring, rotation is applied after mirroring. Tire following values are specified and other
values are reserved:
0: no transform
1: mirroring horizontally
2: rotation by 180 degrees (counter-clockwise)
3: rotation by 180 degrees (counter-clockwise) after mirroring horizontally
4: rotation by 90 degrees (counter-clockwise) after mirroring horizontally
5: rotation by 90 degrees (counter-clockwise)
6: rotation by 270 degrees (counter-clockwise) after mirroring horizontally
7: rotation by 270 degrees (counter-clockwise)
packed_reg_width[i], packed_reg_height[i], packed_reg_top[i], and
packed_reg_left[i] specify the width, height, the top sample row, and the left-most sample column,
respectively, of the region in the packed picture. For each value of i in the range of 0 to num_regions − 1,
inclusive, the rectangle specified by packed_reg_width[i], packed_reg_height[i],
packed_reg_top[i], and packed_reg_left[i] shall be non-overlapping with the rectangle
specified by packed_reg_width[j], packed_reg_height[j], packed_reg_top[j], and
packed_reg_left[j] for any value of j in the range of 0 to i − 1, inclusive.

The VR device may map the unpacked 2D projection image to the virtual spherical projection structure. An example of a system for mapping the 2D projection image to the virtual spherical projection structure may be one as represented in Table 9 shown in FIG. 15.

The VR device may receive, from the server, information for mapping the 2D projection image to the projection structure. An example of the information about the 2D projection image may be the same as that shown in Table 10 illustrated in FIG. 16, Table 11 illustrated in FIG. 17, and Table 12 illustrated in FIG. 18.

The VR device may be obtained by mapping the 2D projection image to the virtual spherical projection structure.

The VR content need not necessarily be received from the server and may be stored in the memory of the VR device. In addition, the operations of 2D-projecting, packing, and transmitting the VR content may be skipped.

According to the embodiment described above, the captured images are stitched onto the spherical projection structure, then the coordinates are rotated, and the 2D projection image is produced, packed, and transmitted. However, the 2D projection image may be produced with the captured images, the positions of the first viewpoint and the second viewpoint to which it has been shifted may be specified on the 2D projection image, and the 2D projection image may be packed and transmitted.

A configuration of a VR device is described below with reference to FIG. 13.

Figure 13:
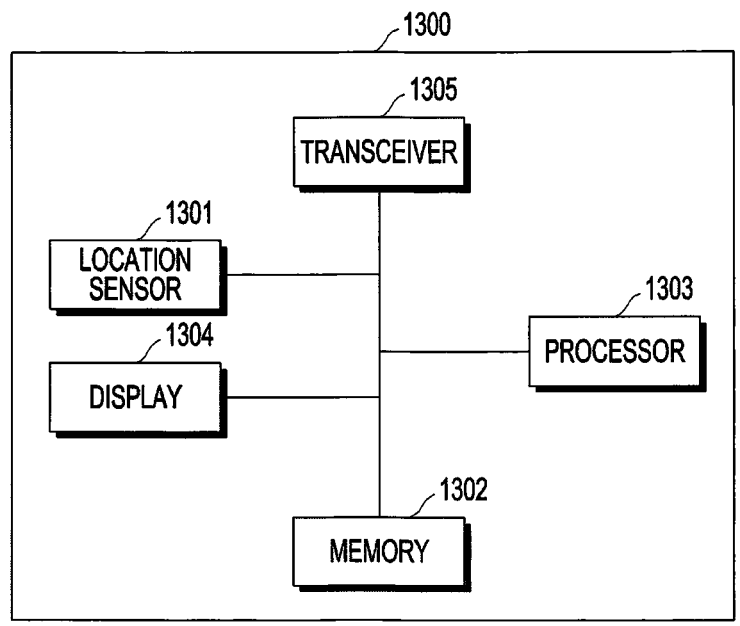
FIG. 13 schematically illustrates a configuration of a VR device, according to an embodiment of the present disclosure.

FIG. 13 schematically illustrates a configuration of a VR device, according to an embodiment of the present disclosure.

A VR device 1300 may include a location sensor 1301 measuring a movement of the VR device 1300, a memory 1302 storing VR content, a processor 1303 controlling all the operations of the VR device 1300, a display 1304 including a display screen displaying VR content provided to a user, and a transceiver 1305 transmitting and receiving signals to/from a server.

All the schemes or methods performed by the VR device 1300 set forth herein may be appreciated as being performed under the control of the processor 1303.

The whole or part of the VR content set forth herein may permanently or temporarily be stored in the memory 1302. The whole or part of an algorithm for all the schemes or methods performed by the VR device 1300 may temporarily or permanently be stored in the memory 1302.

The location sensor 1301, the memory 1302, the processor 1303, the display 1304, and the transceiver 1305 need not necessarily be implemented as separate devices, but may be implemented in a single configuration unit in the form of a single chip. Further, each of the location sensor 1301, the memory 1302, the processor 1303, the display 1304, and the transceiver 1305 need not necessarily be included and some may be omitted.

Figure 14:
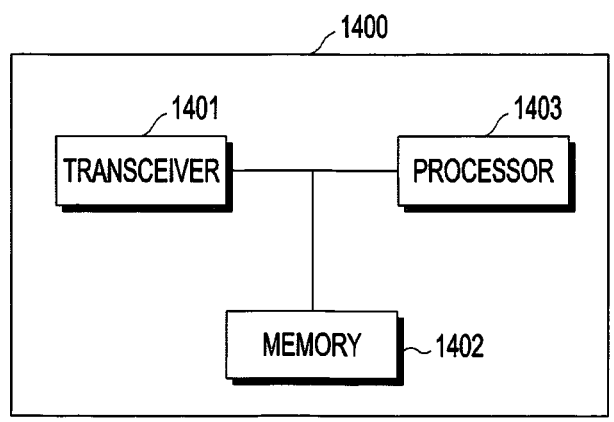
FIG. 14 schematically illustrates a configuration of a server, according to an embodiment of the present disclosure.

FIG. 14 schematically illustrates a configuration of a server, according to an embodiment of the present disclosure.

A server 1400 may include a transceiver 1401 transmitting and receiving signals to/from a VR device, a memory 1402 storing VR content, and a processor 1403 controlling all the operations of the server 1400. All the schemes or methods performed by the server 1400 set forth herein may be appreciated as being performed under the control of the processor 1403.

The whole or part of the VR content set forth herein may permanently or temporarily be stored in the memory 1402. The whole or part of an algorithm for all the schemes or methods performed by the server set forth herein may temporarily or permanently be stored in the memory 1402.

However, the processor 1402, the memory 1402, and the transceiver 1401 are not necessarily implemented as separate devices, respectively, but may be implemented in a single configuration unit in the form of a single chip.

All the configurations or operations illustrated in FIGS. 1 to 14 may or may not be construed as essential components to practice the present disclosure, and the present disclosure may be implemented with only some of the components.

The above-described operations may be realized by equipping a memory device retaining corresponding program codes in any component of the server or VR device. That is, the processor in the server or VR device may execute the above-described operations by reading and running the program codes stored in the memory device by a processor or central processing unit (CPU).

Various components or modules in the server or VR device may be operated using a hardware circuit, a complementary metal oxide semiconductor-based logic circuit, firmware, software, and/or a hardware circuit such as a combination of hardware, firmware, and/or software embedded in a machine-readable medium. Various electric structures and methods may be executed using electric circuits such as transistors, logic gates, or application specific integrated circuits (ASICs).

According to an aspect of the present disclosure, a VR device may provide VR content reflecting the user changing the direction in which she is viewing (e.g., by turning or moving her head), allowing more lifelike VR experiences for users.

Further, the VR device may identify the area the user is viewing and transmitting VR content from, improving the transmission efficiency of VR content.

While the present disclosure has been shown and described with reference to certain embodiments, it will be understood by those skilled in the art that various changes in form and details may be made therein without departing from the spirit and scope of the present disclosure, which is defined, not by the detailed description and embodiments, but by the appended claims and their equivalents.

What is claimed is:

1. A method for processing virtual reality (VR) content by an electronic device, the method comprising:
    identifying first cartesian coordinates of a first position with first spherical coordinates on the VR content;
    identifying rotation information including a yaw rotation component indicating a rotation around a z axis, a pitch rotation component indicating a rotation around a y axis, and a roll rotation component indicating around an x axis;
    identifying second cartesian coordinates of a second position based on the first cartesian coordinates and the rotation information;
    converting the second cartesian coordinates of the second position into second spherical coordinates of the second position; and
    rendering an area of the VR content based on the second spherical coordinates of the second position,
    wherein the second cartesian coordinates of the second position are identified by multiplying the first cartesian coordinates with a matrix defined by:

$$\begin{bmatrix} \cos q \cos v & -\cos q \sin v & \sin q \\ \cos p \sin v + \sin p \sin q \cos v & \cos p \cos v - \sin p \sin q \sin v & -\sin p \cos q \\ \sin p \sin v - \cos p \sin q \cos v & \sin p \cos v + \cos p \sin q \sin v & \cos p \cos q \end{bmatrix}$$

wherein p is an angle corresponding to the roll rotation component, q is an angle corresponding to the pitch rotation component, and v is an angle corresponding to the yaw rotation component.

2. The method of claim 1, further comprising converting the first spherical coordinates of the first position into the first cartesian coordinates of the first position.

3. The method of claim 1, wherein the first position and the second position are viewpoints related to the VR content.

4. The method of claim 1, wherein the rotation information is identified by estimating a relative movement of a user of the electronic device to the first position.

5. The method of claim 1, wherein the electronic device further includes a display providing the VR content to a user, and wherein the area is provided through the display to the user.

6. The method of claim 1, further comprising:
    transmitting information about the second spherical coordinates of the second position to a server; and
    receiving, from the server, information about an area corresponding to the second spherical coordinates of the second position in the VR content.

7. An electronic device for processing VR content, comprising:
    a display; and
    a processor coupled to the display, and configured to:
        identify first cartesian coordinates of a first position with first spherical coordinates on the VR content;
        identify rotation information including a yaw rotation component indicating a rotation around a z axis, a pitch rotation component indicating a rotation around a y axis, and a roll rotation component indicating around an x axis;
        identify second cartesian coordinates of a second position based on the first cartesian coordinates and the rotation information;
        convert the second cartesian coordinates of the second position into second spherical coordinates of the second position; and
        rendering an area of the VR content based on the second spherical coordinates of the second position;
    wherein the second cartesian coordinates of the second position are identified by multiplying the first cartesian coordinates with a matrix defined by:

$$\begin{bmatrix} \cos q\cos v & -\cos q\sin v & \sin q \\ \cos p\sin v + \sin p\sin q\cos v & \cos p\cos v - \sin p\sin q\sin v & -\sin p\cos q \\ \sin p\sin v - \cos p\sin q\cos v & \sin p\cos v + \cos p\sin q\sin v & \cos p\cos q \end{bmatrix}$$

wherein p is an angle corresponding to the roll rotation component, q is an angle corresponding to the pitch rotation component, and v is an angle corresponding to the yaw rotation component.

8. The electronic device of claim 7, wherein the processor is further configured to convert the first spherical coordinates of the first position into the first cartesian coordinates of the first position.

9. The electronic device of claim 7, wherein the first position and the second position are viewpoints related to the VR content.

10. The electronic device of claim 7, wherein the rotation information is identified by estimating a relative movement of a user of the electronic device to the first position.

11. The electronic device of claim 7, wherein the display is configured to provide the area to the user.

12. The electronic device of claim 7, further comprising a transceiver configured to transmit information about the second spherical coordinates of the second position to a server and receive, from the server, information about an area corresponding to the second spherical coordinates of the second position in the VR content.

\* \* \* \* \*